(12) United States Patent
Martin, Jr. et al.

(10) Patent No.: US 7,623,026 B2
(45) Date of Patent: Nov. 24, 2009

(54) OMNI DIRECTIONAL UNIVERSAL MOUNT HAZARD MARKER

(75) Inventors: Louis Martin, Jr., Stuart, FL (US); Jerry Laidman, Stuart, FL (US)

(73) Assignee: TotalFlare, Inc., Stuart, FL (US)

( * ) Notice: Subject to any disclaimer, the term of this patent is extended or adjusted under 35 U.S.C. 154(b) by 0 days.

(21) Appl. No.: 11/549,419

(22) Filed: Oct. 13, 2006

(65) Prior Publication Data

US 2008/0088477 A1 Apr. 17, 2008

(51) Int. Cl.
*B60Q 7/00* (2006.01)

(52) U.S. Cl. .............. 340/473; 116/63 P; 340/321; 340/908

(58) Field of Classification Search ............ 340/473, 340/908.1, 908, 321, 332; 362/800; 116/63 P
See application file for complete search history.

(56) References Cited

U.S. PATENT DOCUMENTS

| | | | |
|---|---|---|---|
| 2,361,414 A * | 10/1944 | Ramsey | 362/108 |
| 3,766,881 A | 10/1973 | Ward | |
| 3,934,541 A | 1/1976 | May et al. | |
| 4,174,532 A * | 11/1979 | Kelley | 362/102 |
| 4,292,627 A * | 9/1981 | Knight | 340/908 |
| 4,489,306 A * | 12/1984 | Scolari | 340/473 |
| 4,613,847 A | 9/1986 | Scolari et al. | |
| 4,734,835 A * | 3/1988 | Vines et al. | 362/264 |
| 4,827,245 A * | 5/1989 | Lipman | 340/321 |
| 5,122,781 A * | 6/1992 | Saubolle | 340/473 |
| 5,252,893 A | 10/1993 | Chacham et al. | |
| 5,412,381 A | 5/1995 | Dicks | |
| 5,521,595 A | 5/1996 | Totten et al. | |
| 5,558,429 A * | 9/1996 | Cain | 362/155 |
| 5,561,346 A | 10/1996 | Byrne | |
| 5,585,783 A * | 12/1996 | Hall | 340/473 |
| 5,594,433 A | 1/1997 | Terlep | |
| 5,606,309 A | 2/1997 | Smith | |
| 5,754,124 A | 5/1998 | Daggett et al. | |
| 5,755,174 A * | 5/1998 | Freeman | 116/63 C |
| 6,027,227 A | 2/2000 | Tung | |
| 6,183,100 B1 | 2/2001 | Suckow et al. | |

(Continued)

FOREIGN PATENT DOCUMENTS

GB 2190235 A * 11/1987

*Primary Examiner*—Brent Swarthout
(74) *Attorney, Agent, or Firm*—McHale & Slavin, P.A.

(57) ABSTRACT

A self-contained hazard marker which is easily deployed and highly visible. The hazard marker utilized an elevated collapsible illumination device which utilizes LEDs mounted to a flexible printed circuit board in a fashion that allows the circuit board to be formed into a tubular shape with the LEDs on the outer surface of the tube in a fashion that disperses the light in a 360 degree pattern. These LEDs can be illuminated in various patterns thereby producing various effects. They can produce a rotating light effect, a blinking light effect, a strobe effect and a simulated flare. The elevated illumination device is also collapsible into the body (protection chamber) of the marker in the event a vehicle is driven over the marker. The marker has a ramp shape to it that starts at ground level and extends to the top of the unit. This shape inherently prevents the unit from lateral movement when impacted. The unit also contains deployable securing devices which also prevent the marker from being moved horizontally from its operative position.

19 Claims, 15 Drawing Sheets

U.S. PATENT DOCUMENTS

| | | |
|---|---|---|
| 6,259,373 B1 | 7/2001 | Ghahramani |
| 6,275,149 B1 | 8/2001 | Tung |
| 6,340,868 B1 * | 1/2002 | Lys et al. ............... 315/185 S |
| 6,450,677 B1 | 9/2002 | Knauer et al. |
| 6,483,439 B1 * | 11/2002 | Vukosic ............... 340/815.65 |
| 6,486,797 B1 | 11/2002 | Laidman |
| 6,549,121 B2 * | 4/2003 | Povey et al. ............... 340/322 |
| 6,553,929 B1 | 4/2003 | Harp |
| 6,683,532 B2 | 1/2004 | Peet, II et al. |
| 6,753,762 B1 | 6/2004 | Gonzalez |
| 6,778,077 B1 | 8/2004 | DeGraaf |
| 6,839,001 B1 | 1/2005 | Bonin |
| 6,939,021 B2 | 9/2005 | Leslie et al. |
| 6,963,275 B2 | 11/2005 | Smalls |
| 2004/0218382 A1 | 11/2004 | Saban et al. |
| 2005/0083692 A1 | 4/2005 | Leen |
| 2005/0254240 A1 | 11/2005 | Lawrence et al. |
| 2006/0120086 A1 * | 6/2006 | Yuen ............... 362/346 |
| 2006/0132323 A1 * | 6/2006 | Grady ............... 340/815.45 |

\* cited by examiner

OMNI DIRECTIONAL UNIVERSAL MOUNT HAZARD MARKER

FIELD OF THE INVENTION

This invention is in the general field of warning, and position signaling devices, and more particularly, illuminated Omni directional warning devices which can be utilized with various accessories.

BACKGROUND OF THE INVENTION

Hazard, and position markers are normally used to indicate that a problem is nearby, and individuals should either stay away or proceed with caution. Additionally these devices are also deployed to indicate a specific location (i.e. a lost person in the wilderness, a police or a military check point, or even a target location). The most common problems are vehicle accidents or breakdowns. Some of the reasons for using hazard markers in these situations include the protection of the people involved in the accident or breakdown and discouraging other people from driving or walking into the problem area. They are also used to discourage people from intruding into areas where emergency medical personal are treating injuries resulting from the accident or other personal are cleaning up the debris from the accident. Currently the most widely used hazard markers are sulfur based burning flares, large sequentially illuminated arrows, message signs, wooden barricades with a flashing light, and orange cones and barrels.

While the flare has an advantage of being easily visible both during the day and after dark, it also has the numerous disadvantages i.e. temporarily blinding motorists who drive by them after dark. This situation endangers the motorist and the people involved in the accident or breakdown. Another more serious problem exists when flares are used at the scene of an accident which has resulted in the spillage of gasoline, or other flammable fluids, or in an area that has local brush or other flammable ground cover. Other undesirable aspects of the flare include the risk of the person igniting the flare being burned and having their clothes burned, as well as the frequent deployment requirement due to their short burn time. Flares also release noxious fumes, and environmental contaminants while burning.

Orange cones or barrels are other popular hazard markers. They frequently have a blinking light attached thereto. A disadvantage of these is that the light cannot be readily seen outside of the immediate vicinity of the cone or barrel, especially in poor weather conditions. An additional problem associated with the cone, or marker light is that there are normally a directional marker only visible from a single view point, additionally in order for this type of marker to be visible they are dependent on size. This makes this device require a larger storage area, and makes their deployment difficult. Another problem with these hazard markers is that the light is frequently destroyed or severely damaged whenever the cone or barrel is inadvertently struck by a passing motorist, additionally the size of the device is large and when struck not only is the device normally damaged, but the unit itself becomes a projectile and can cause damage to property, as well as cause personal injury.

Flares are typically used in the boating industry to indicate a vessel in peril. While being highly visible they also pose a very serious problem. Normally a vessel in peril is not moving and the opportunity for gasoline vapor accumulation is great. Also, once a flare is lit is must be held over the side of the boat to prevent the hot molten material from the flare from damaging the boat which is usually made from fiberglass or has a fiberglass outer coating. As a result the flare cannot be set down and left unattended like normally done in a roadside situation.

DESCRIPTION OF THE PRIOR ART

U.S. Pat. No. 6,486,797 discloses a highway marker comprising a disc shaped housing formed of a high impact plastic. The upper portion of the housing is transparent. A plurality of LEDs are disposed in a circle in the upper portion of the marker. The LEDs are controlled by a circuit which includes a ring counter to provide signals to transistors which sequentially drive the LEDs.

U.S. Pat. No. 6,183,100 discloses a LED warning lamp which comprises a housing, a printed circuit board secured within the housing, a plurality of LEDs mounted to the printed circuit board and operatively arranged to produce light in substantially a 360° arc surrounding the housing in a horizontal plane and a driving circuit operatively arranged to flash the plurality of LEDs.

U.S. Pat. No. 4,489,306 discloses an illuminated warning device that is collapsed by disengaging a series of locks that hold series of interlocking squares. These squares are extended and locked into an operating position forming a ridged and larger cone shaped device. This configuration allows the device to be collapsed for storage. The device is only operational when in the extended and locked position.

U.S. Pat. No. 4,292,627 discloses an illuminated warning device that places a light source inside of a translucent road cone. The light source causes the road cone to glow with a visible color. The weight of this device makes the device stable in a high wind condition.

U.S. Pat. No. 5,122,781 discloses an illuminated warning device that is based on the use of a collapsible tripod type stand. The tripod elevates and locks the illuminator into an elevated visible position. The device emits an unidirectional light that is pointed into the on-coming traffic.

U.S. Pat. No. 4,827,245 discloses an illuminated warning device that employees a series of Omni directional strobe tubes designed to sequence. They are battery operated and fired from a decade counter in a locked pattern.

U.S. Pat. No. 6,483,439 discloses an illuminated warning lamp that employees LEDs as a light source. This high profile device places the LEDs at 180 degrees from each other. The LEDs are diffused by the use of a fresnel lens in order to be omni directional in nature. The LEDs are mounted on 3 discreet ridged printed circuit boards.

U.S. Pat. No. 6,549,121 b2 discloses an illuminated uni directional warning device in a low profile housing. This device employs LEDs that are aimed in a single direction, and elevation.

SUMMARY OF THE INVENTION

The present invention provides a self-contained hazard marker, and signaling device which is easily deployed and highly visible from any direction. The hazard marker incorporates a water sealed, self contained "light plug" system that stands above the low profile base unit of the hazard marker. This elevated light plug placement as compared to a low profile light source (see prior art U.S. Pat. No. 6,486,797) provides increased visibility of the light source by eliminating ground reflection, and blockage due to road dips, and obstacles (i.e. grass fields) that might obstruct the light source visibility. The placement the light plug unit elevated above the low profile base unit would normally make the unit subject to damage when impacted by a moving vehicle. This hazard marker device design employs a unique double wall constructed "protection chamber". This protection chamber is designed to protect the light plug unit when impacted. Upon impact the light plug is pushed down into the protection chamber. This protects the light plug from direct impact. Immediately after the unit is impacted the light plug returns to the extended position and resumes operation. The design of the protection chamber also provides a central ridged support for base unit design that accommodates the locking mechanism for the changeable portable battery pack unit. Additionally the protection chamber double wall construction provides the necessary strength to the device with out the requirement for thick wall molding techniques that are an inherently difficult process in the field of plastic injection molding. This light plug is a feature of the device that separates this warning device from any other device currently available. The light plug is self contained and houses all electronics as required to operate a plurality of LEDs, or other light sources such as Zeon strobe lamp, or incandescent light bulbs. Since the light plug device is self contained it can easily be changed in field for repair, or upgrade. (i.e. change the color of the light source.) This self contained light plug is also compatible with a selection of optional mount units. (i.e. the light plug can snap into a flash light handle thus creating a hand held signal wand.) This light plug illumination device which utilizes LEDs or other light sources can be illuminated in various patterns thereby producing various effects. They can produce a rotating light effect, a blinking light effect, a strobe effect that is designed to simulate the appearance of a burning flare. The marker device also contains a low profile (tread lock edge) this low profile edge is a design intended to secure the device from lateral travel by eliminating any vertical edge to the shape of the base unit that might cause lateral movement when impacted by a moving vehicle. The tread lock edge is less than 0.125" high. This low profile design acts as a smooth ramp so a tire of a vehicle will drive over the unit, holding the unit down to the surface which will prevent lateral movement. Additionally the bottom portion of the unit contains deployable securing devices which further prevent the marker from being moved horizontally from its operative position.

Accordingly, it is an objective of the instant invention to provide a self-contained hazard marker which includes an elevated illumination device that when impacted collapses into A low profile protection chamber with in the base of the unit. The hazard marker is formed from a plurality of component modules which are readily assembled.

It is a further objective of the instant invention to provide a hazard marker formed from a high impact resistant plastic and including:

1. An elevated collapsible self contained illumination device referred to as the "light plug" this light plug when combined with the double wall protection chamber is a design that allows the marker to be severely impacted by a vehicle and not sustain physical damage, while minimizing the possibility of lateral movement due to said impact.
2. A double wall protection chamber made of interlocking high impact plastic. This double wall construction allows plastic thicknesses to exceed the thickness of plastic obtainable with in the practice of standard injection molding.
3. A removable battery chamber that secures to the exterior surface of the protection chamber with a helical high impact thread lock. These two elements of the design create the double wall structure.
4. A light chamber that has an internal sealed magnetic reed switch. This switch allows the light plug housing to act as a push button switch used to select the desired program pattern as will as provide all on and off functions.

It is yet another objective of the instant invention to provide a hazard marker light including a plurality of light emitting diodes (LEDs), or other light sources that are mounted to a single flexible circuit board along with all associated electronics as required to provide the power and control to the selected light source. The use of a flexible printed circuit board for the purpose of aiming the light sources is unique in that it eliminates a complex multi board design that would normally be associated with the aiming of light sources around a 360 degree pattern. This flexible printed circuit board also allows for an extreme high density placement of light sources due to the fact that there are no multiple board interconnects. The high density placement allows the entire surface of the light plug to be covered by LEDs, or other light sources. This high density placement gives the unit a visual appearance that is intended to duplicate the appearance of the flame created by an incendiary flare.

It is yet another objective of the instant invention to provide a hazard marker light including a plurality of light emitting diodes (LEDs) that are circularly disposed within a housing. The LEDs are oriented either to provide light which can be seen by a motorist at a substantial distance from the hazard marker or provide light that can be seen by aircraft flying above the hazard.

It is a still further objective of the invention to provide a hazard marker light that can be programmed to produce different light effects such as rotating lights, flashing lights, strobe lights or a simulated flare. This programmability also allows the unit to operate in an extended battery mode. This mode effectively doubles the battery life of the device by operating the light source at a 50% dim output setting.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

DETAILED DESCRIPTION OF THE INVENTION

Figure 1:
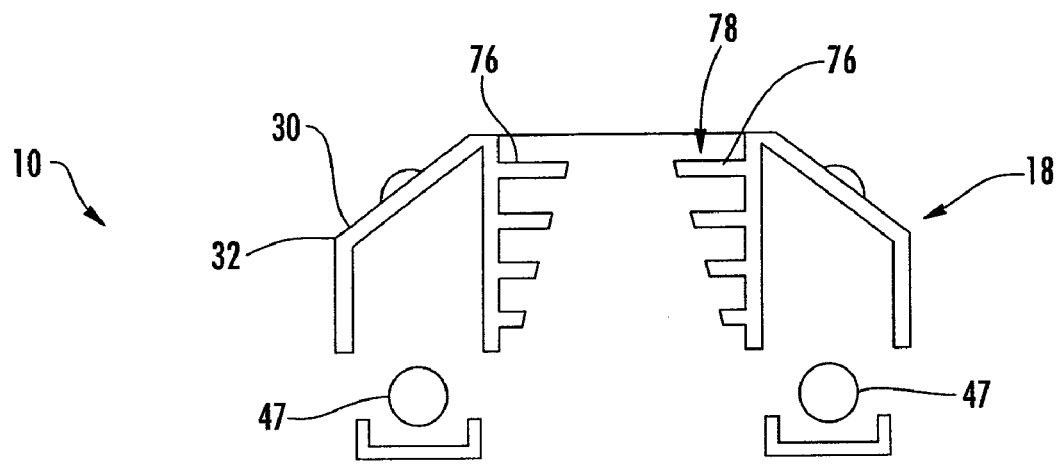
FIG. 1 is a cross sectional view of the changeable battery module.
Figure 11:
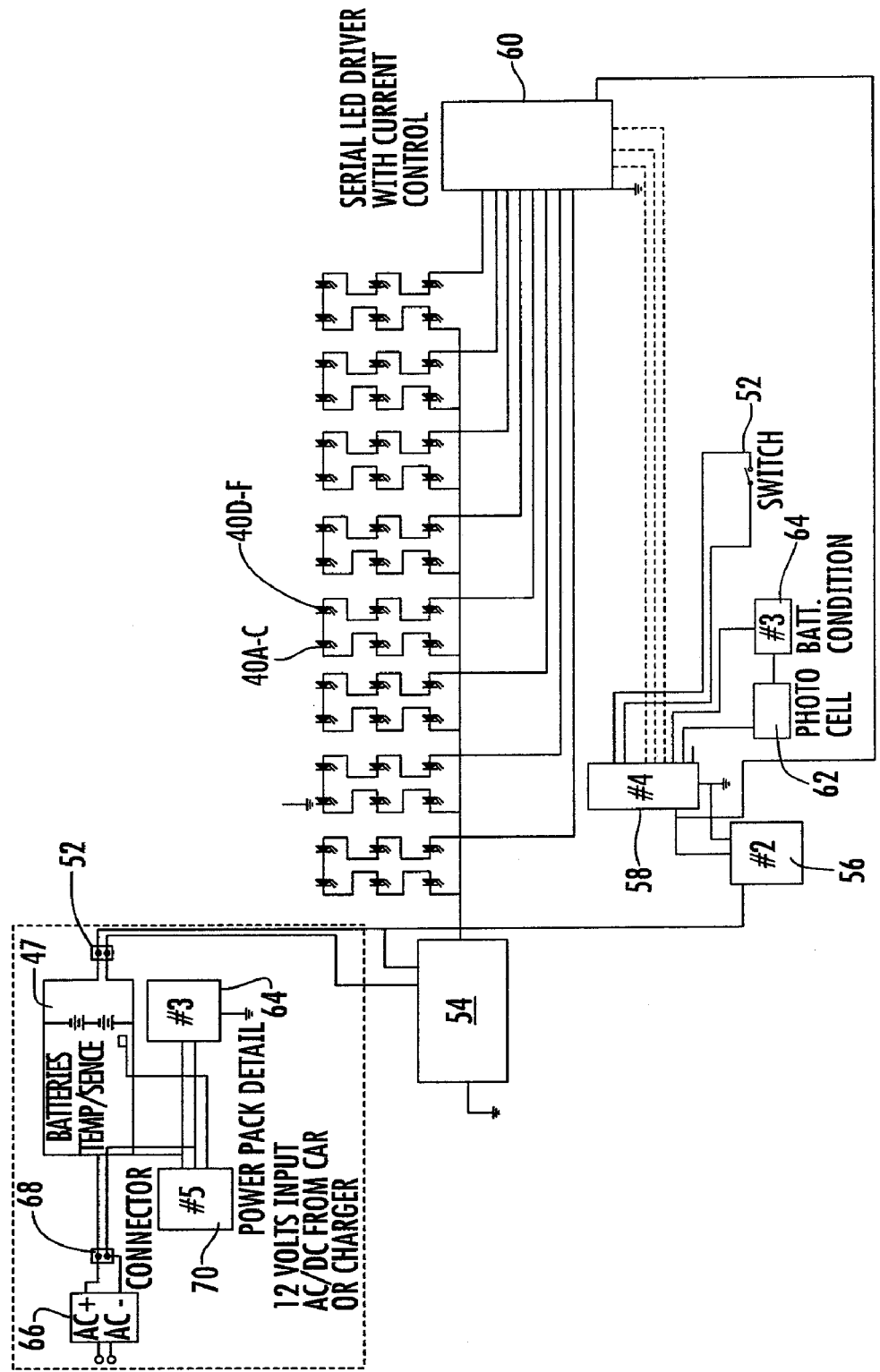
FIG. 11 is a schematic illustrating the elements of the electrical power and control circuits.
Figure 12:
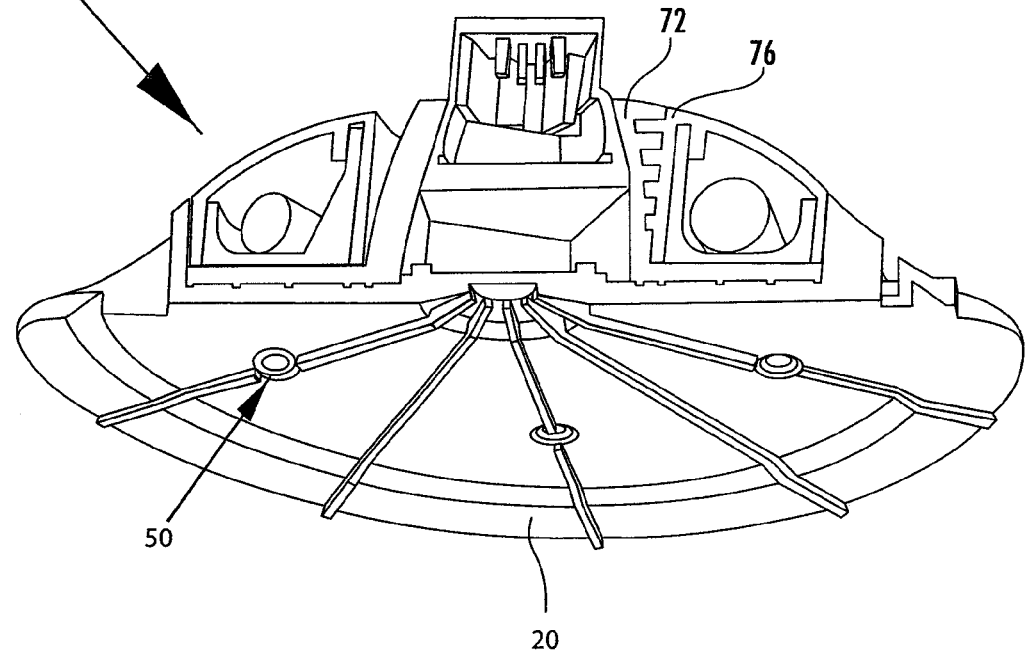
FIG. 12 is a perspective cross sectional view of the device.

As shown in FIGS. 1-27 the preferred embodiment of hazard marker 10 of the present invention has a generally cylindrical, disc shape as shown on FIG. 12. This assembly includes a lower base unit FIG. 4, an Omni directional illumination module FIG. 3, a protection chamber FIG. 2, and a changeable battery module FIG. 1. All these components are preferably made from high impact plastic that can withstand a vehicle being driven over them without damage. The illumination module IS transparent, or tinted UV stable plastic (LEXAN®).

Figure 4:
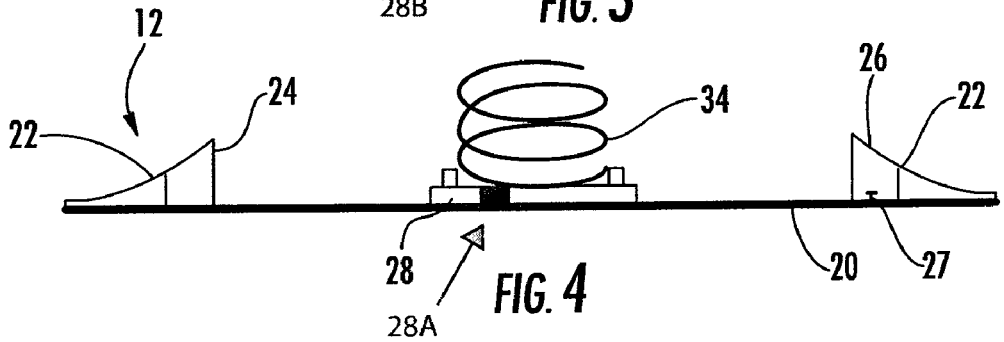
FIG. 4 is a cross sectional view of the base unit.
Figure 5:
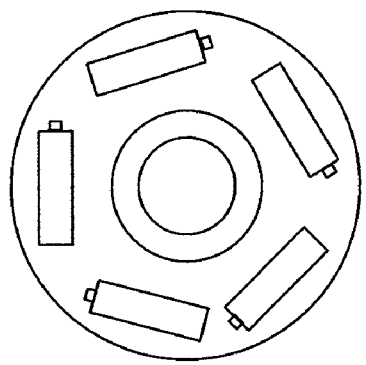
FIG. 5 is a top cross sectional view of the battery module illustrating the placement of the batteries.
Figure 6:
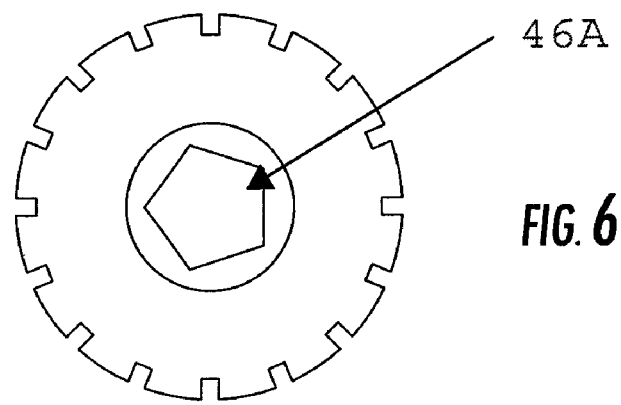
FIG. 6 is a top view of the protection chamber.
Figure 7:
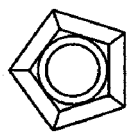
FIG. 7 is a top view of the illumination module (light plug)
Figure 8:
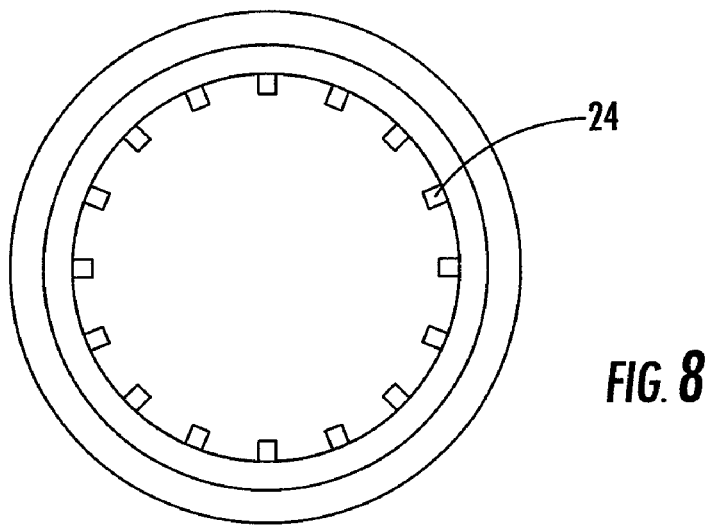
FIG. 8 is a top view of the base unit.
Figure 9:
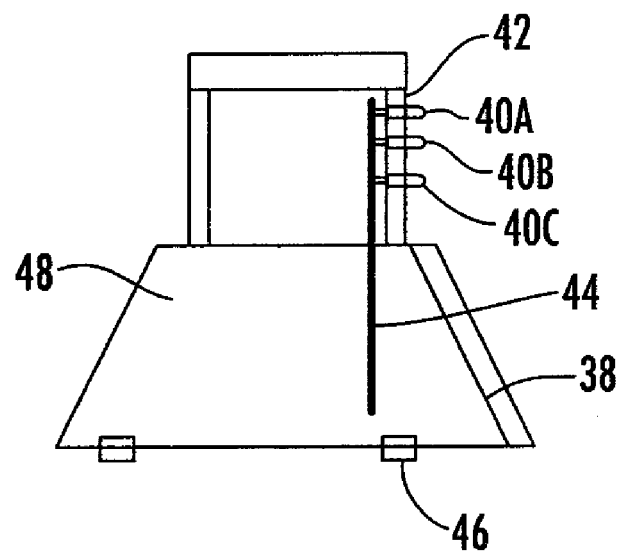
FIG. 9 is a sectional view of the illuminating module illustrating the LEDS and circuitry.

The base unit FIG. 4 includes a base surface 20 which is designed to engage a support surface such as a roadway. The base surface 20 is designed and constructed so as to not damage the surface on which it is placed. For example, the present invention can be placed on an automobile, boat or other vehicle without damaging the surface of the vehicle. The base unit FIG. 4 includes sloped surfaces 22 this is referred to as the tread lock feature. This surface varies in height from approximately ground level to the height of the lowermost portion 32 of the upper sloped surface 30 of the upper portion of the upper housing 18. This provides a smooth ramp transition surface over the device in the event that a vehicle runs over the device on a roadway. This low profile ramp minimizes the vertical surface of the device in a fashion intended to prevent lateral travel of the unit when hit by a vehicle.

The base unit also includes projections 24. These projections are preferably equally spaced around the outer portion of base 20 and are preferably molded together with the base 20. These projections 24 function to align and secure the protection chamber 16 and the battery pack 18 to the base unit, as will be explained hereinafter. The base unit and protection chamber can be secured together with screws or other fastening means that are aligned with and pass through openings 50 in the base unit 20. The base unit additionally includes securing member housings 26 preferably equally spaced around the outer portion of base 20. The housings 26 contain deployable securing members 27. The securing members are deployed whenever a vehicle runs over the hazard marker. The vehicle's tire will compress housing 26 downwardly thereby expelling the securing member 27. The securing member can now engage and penetrate the surface on which the marker is resting, normally the roadway. This further prevents the marker from being moved in a horizontal direction by the vehicle's tire and prevents the marker from being projected into a person or other object. The screws or fasteners which secure the base 20 to the protection chamber 16 can also be deflected into the surface below the marker and prevent the marker from moving in a horizontal direction. In the center of base 20 a support 28 is positioned. The support 28 is constructed to hold and maintain spring 34 in its operative position. The base unit 20 also retains the magnet 28a. This magnet is the actuator for the reed switch as shown on FIG. 3, number 28b.

The illumination module comprises an upper portion 36 and a lower portion 38. As illustrated in FIG. 4, spring 34 engages the lower portion of illumination module 14 and urges the module into its uppermost operating position. Spring 34 also functions as an electrical connection between the batteries 47 and the control circuit mounted on the flexible printed circuit board 44 the light module 14 is formed from a transparent material and contains a plurality of light sources mounted therein. In a preferred embodiment the light sources are LEDs. The LEDs are mounted to the flexible circuit board that is curved to fit the sidewall of the illumination chamber. This curving is shown on FIG. 26 and FIG. 27. Electrical connectors 46 connect the light plug 14 to the control circuit placed on printed circuit board 44 via the spring 34 with the batteries 47.

The power source and control circuit are illustrated in FIG. 11. A plurality of batteries 47 are connected to a power source input 52 connection on circuit board 44. A pulse width modulation boost current regulator 54 is connected to the power source and supplies the proper current to drive the LEDs. A voltage regulator 56 controls the voltage input to the PIC controller 58. The PIC controller controls the LED drivers 60 which in turn activate the LEDs 40. The PIC controller can activate the LEDs simultaneously or sequentially. The PIC is programmed to activate the LEDS in at least 6 different modes of operation as will be explained herein after. The modes are rotate, strobe fast, strobe slow, fire flicker, barricade flash low power and barricade flash with night time sensor. The night time sensor preferably comprises a photo sensor 62 located on the circuit board. This photo cell can detect a day time condition and adjust the output level of the device to optimize usage during the day time or the night time. The photo cell detects a light frequency other that the frequency emitted from the LEDs. This allows for accurate response from a photo cell in the close proximity of the light source.

A battery condition sensor 64 is employed to sense low battery condition. When these conditions are sensed the PIC is programmed to activate the lowermost ring of LEDs in the illumination module. This is an indicator that the batteries need to be recharged or replaced. If rechargeable batteries are employed they can be recharged utilizing a recharger 66 connected to the circuit at 68. A controller 70 monitors the recharging so that the batteries will not be over charged.

Figure 3:
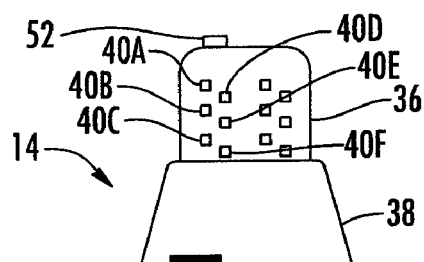
FIG. 3 is a cross sectional view of the illumination module.
Figure 10:
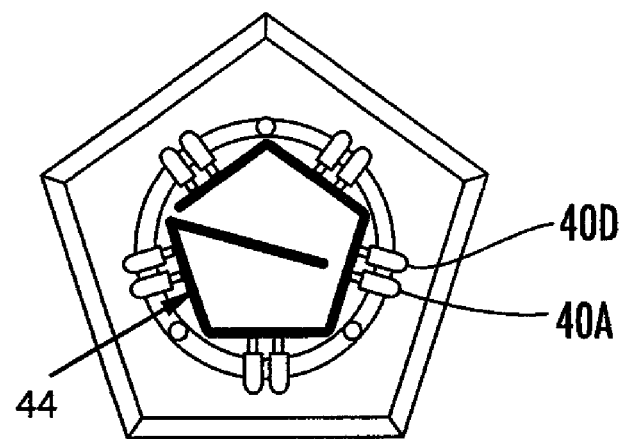
FIG. 10 is a top cross sectional view of the illumination module illustrating the placement of the light banks, and the flexible printed circuit board.
Figure 20:
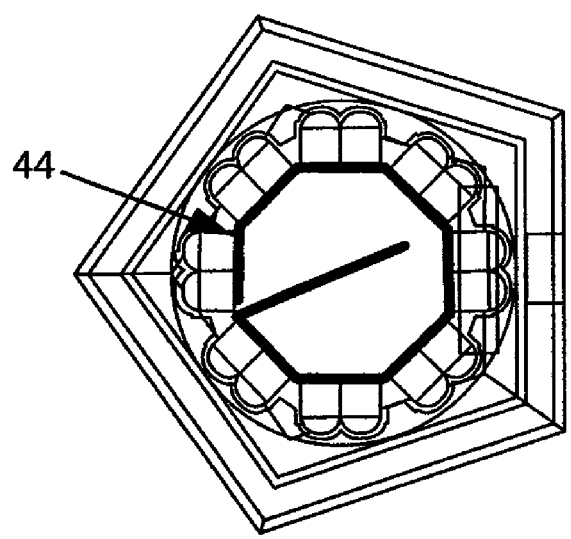
FIG. 20 is a cross sectional view of the illumination module showing the led placement, as well as the curved flexible printed circuit board.
Figure 21:
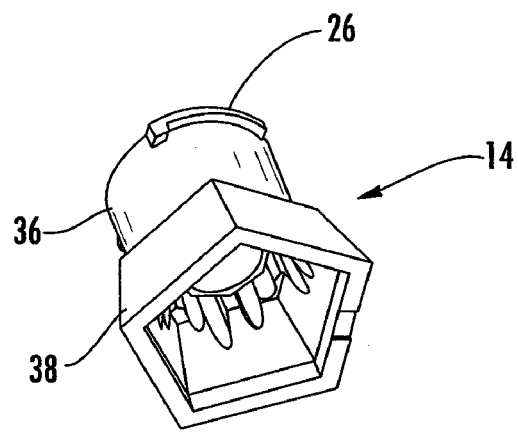
FIG. 21 is a perspective view of the illumination module taken from the bottom. this shows the sun shield accessory holder lock.
Figure 22:
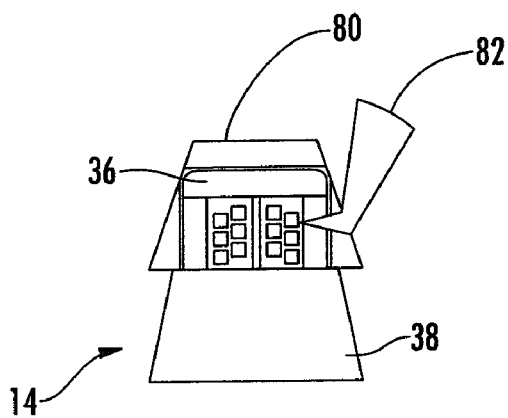
FIG. 22 is side view of the illumination module including an optional vertical view lens.
Figure 23:
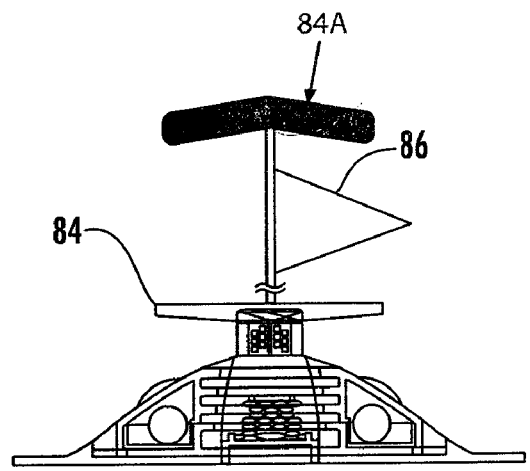
FIG. 23 is a side view of the hazard marker with the attached sunshield, flag pole, and retrieval handle system in place on top thereof.

The LEDs are preferably arranged in banks equally spaced around the circumference of the illumination module, as illustrated in FIG. 10, and FIG. 20. Each bank of LEDs is preferably formed with two columns of vertically spaced LEDs 40A-F as illustrated in FIG. 3. The LEDs 40 A-C being vertically offset from LEDs 40 D-F. Other arrangements of the LEDS are possible. These arrangements will produce different visual effects simulating different lighting arrangements. The LEDs preferably emit a red light. However, they may emit various other colors such as white, blue and orange. Other colors are also possible. Different color LEDs can be used together so that the hazard marker appears to be different color lights, such as red and blue. Light sources which emit infrared or ultraviolet light can also be employed. A flexible printed circuit board, preferably a Kapton® flexible board 44, is housed in the light plug module. This flexible board holds all components as indicated in FIG. 11. This provides a single piece rugged electronic assembly on a flexible medium. This flexibility FIG. 26 and FIG. 27 allows the led placement to conform to the housing 36. See placement (FIG. 20). The PIC controller 58 controls the led current driver 60 which in turn provide the different patterns of illumination of the LEDs. The LEDs can appear to be a rotating light. They can also give the appearance of a strobe light. More importantly the led driver allows current control of the led drive so dimming can be accomplished. This dim ability can be used to greatly extend battery life.

The control circuit also incorporates a matrix scan circuit design. This design cycles through the LEDS at 400 HZ. In a preferred embodiment there are eight banks of LEDs which are activated by 8 channels from the controller. Only one of the channels and corresponding bank of LEDs is on at a given time. However, since it operates at 400 HZ it has the appearance that all the LEDS are on simultaneously. This type of operation allows for extended battery life, requires a minimum of components and permits adjustable brightness that allows for a greater program capability. In certain modes of operation the battery life can be extended up to 400 hours. Preferably, each of the 8 banks of LEDs comprise 6 normal LEDs and 2 super bright LEDs.

A magnetic reed switch 28B is positioned on the bottom of the illumination module as shown in FIG. 3. The reed switch is used as an on-off switch for the LEDs, the reed switch is activated when the user depresses the illumination device into the protection chamber where the magnet is positioned. 28a. This eliminated the requirement for a discrete switch that would be subject to damage. It also allows the unit to be activated by pressing down with your foot.

The reed switch can be used to select the different modes of operation of the LEDs. The different modes of operation are: Rotate—the LEDs give the appearance of a rotating light; Strobe Fast—the LEDs are pulsed quickly; Strobe Slow—the LED are strobed slowly; Fire Flicker—the LEDs give the appearance of a burning flare or flame; Barricade Flash (low power)—used with physical barricades to warn other individuals; and Barricade Flash (night time sensor enabled)—a photo sensor 62 activates the hazard marker after dark and turns it off after sunrise. These different modes of operation are activated by double clicking the reed switch. The controller cycles through the different modes of illumination of the LEDs. When the desired mode is reached the operator only needs to not select the next mode for a given period of time, for example 10 seconds, and the LEDs will continue to operate in that mode. This mode of operation remains in the controller after the hazard marker is turned off so that whenever the hazard marker is turned on again the LEDs will operate in the same mode as when it was last active. The illumination module is permanently sealed and completely water tight. This permits the electronic assembly to receive an underwater rating.

Figure 2:
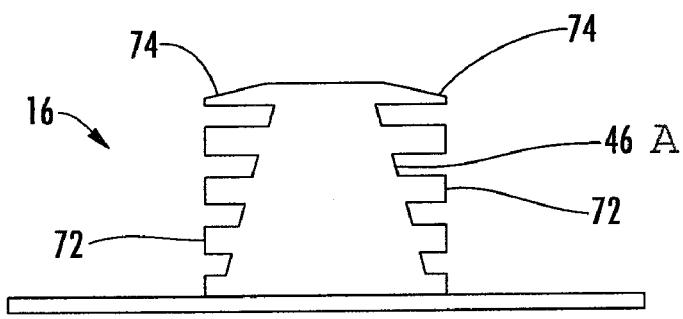
FIG. 2 is a cross sectional view of the protection chamber.
Figure 13:
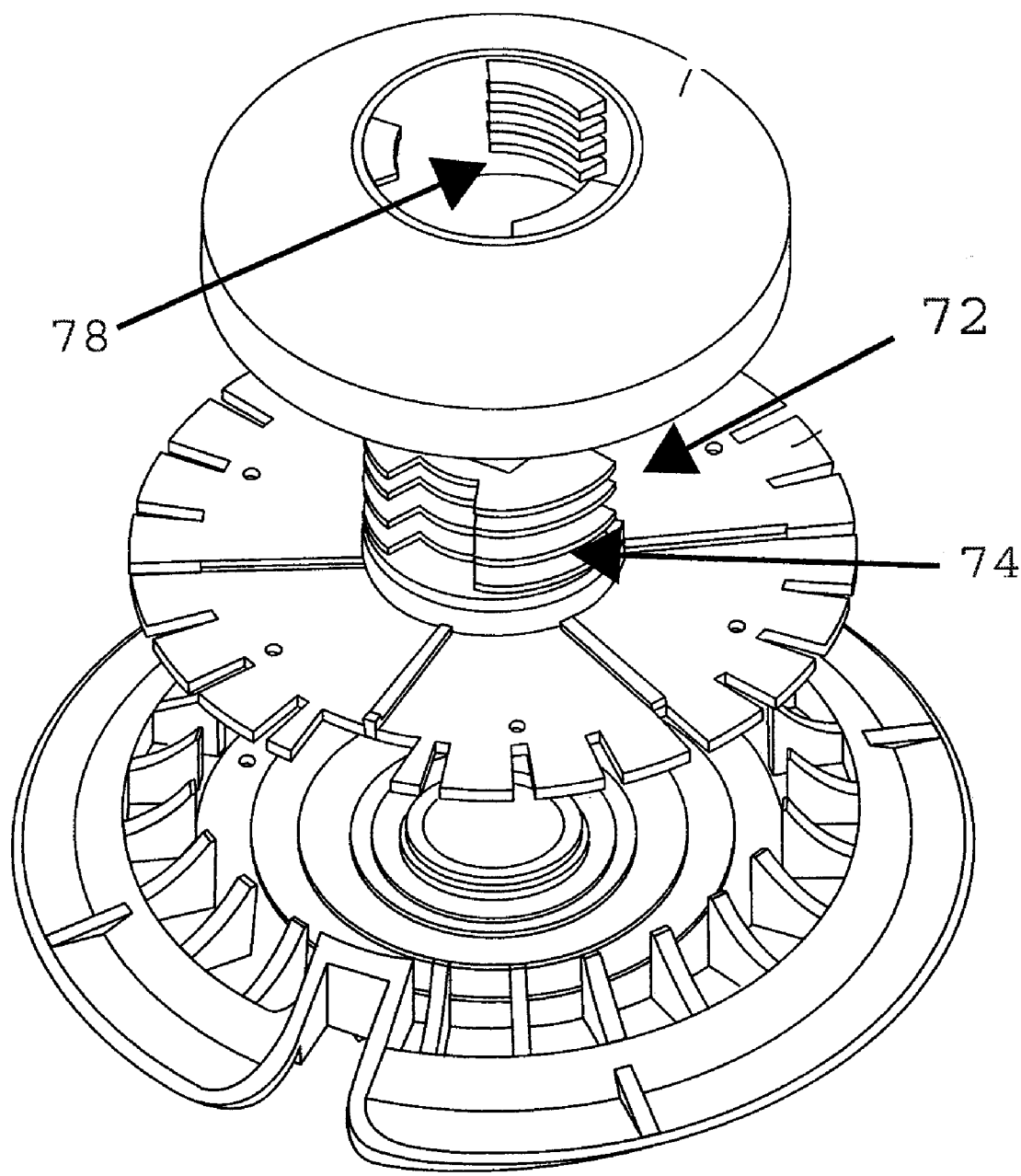
FIG. 13 is an exploded view of the battery module, the protection chamber and the base unit.
Figure 14:
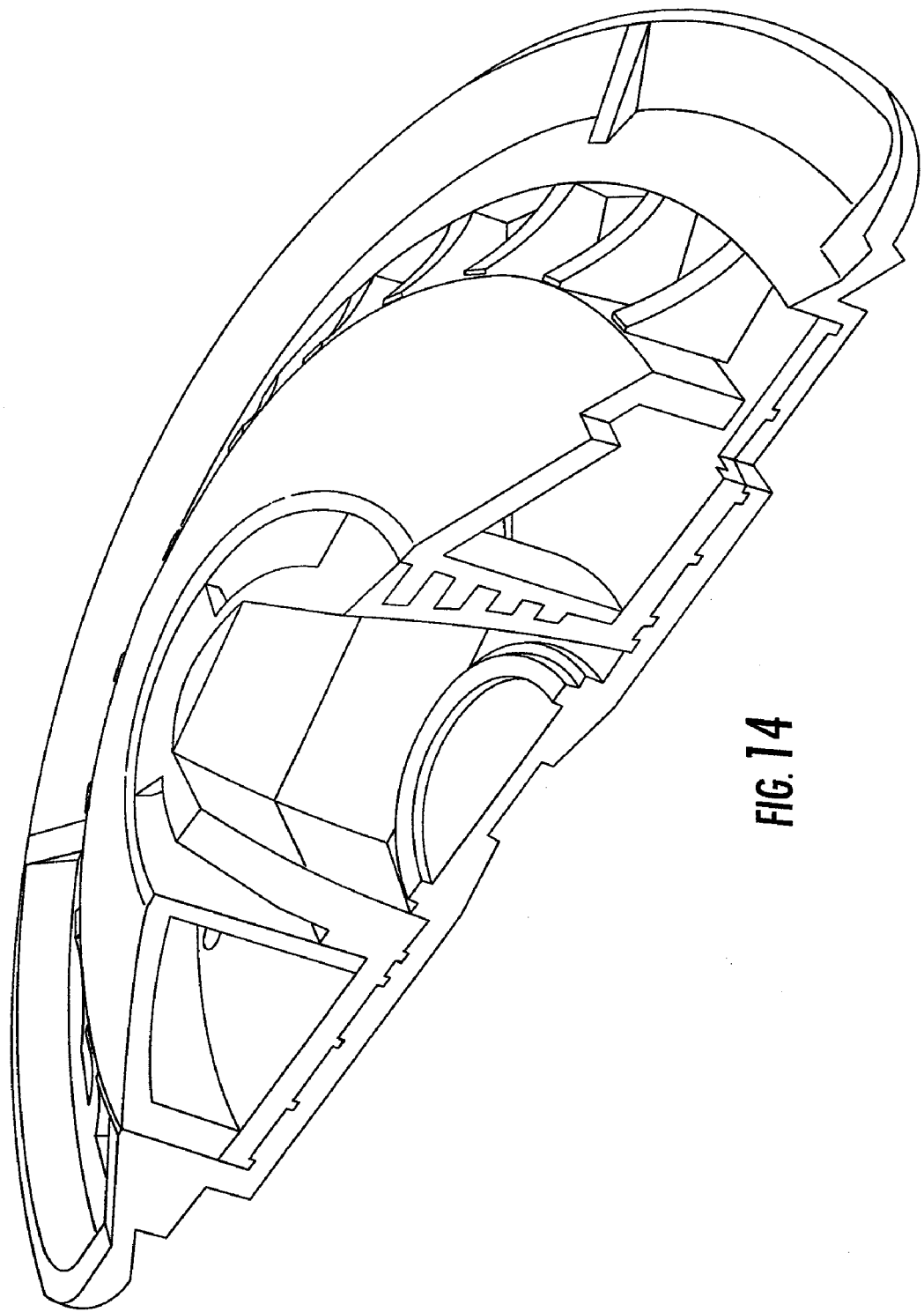
FIG. 14 is a cross section view of the elements in FIG. 13 in an assembled condition.
Figure 15:
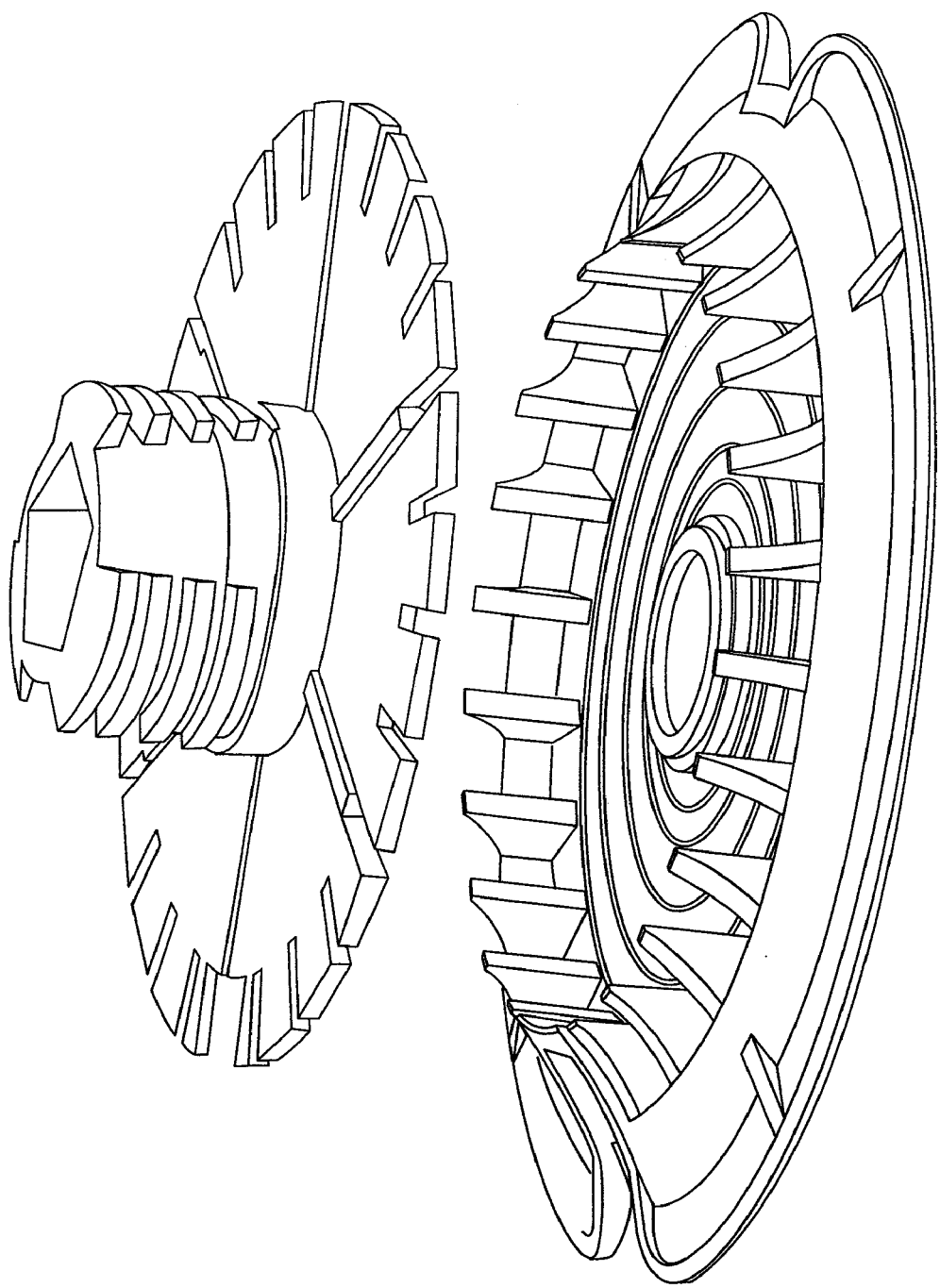
FIG. 15 is an exploded view of the protection chamber and the base unit.
Figure 16:
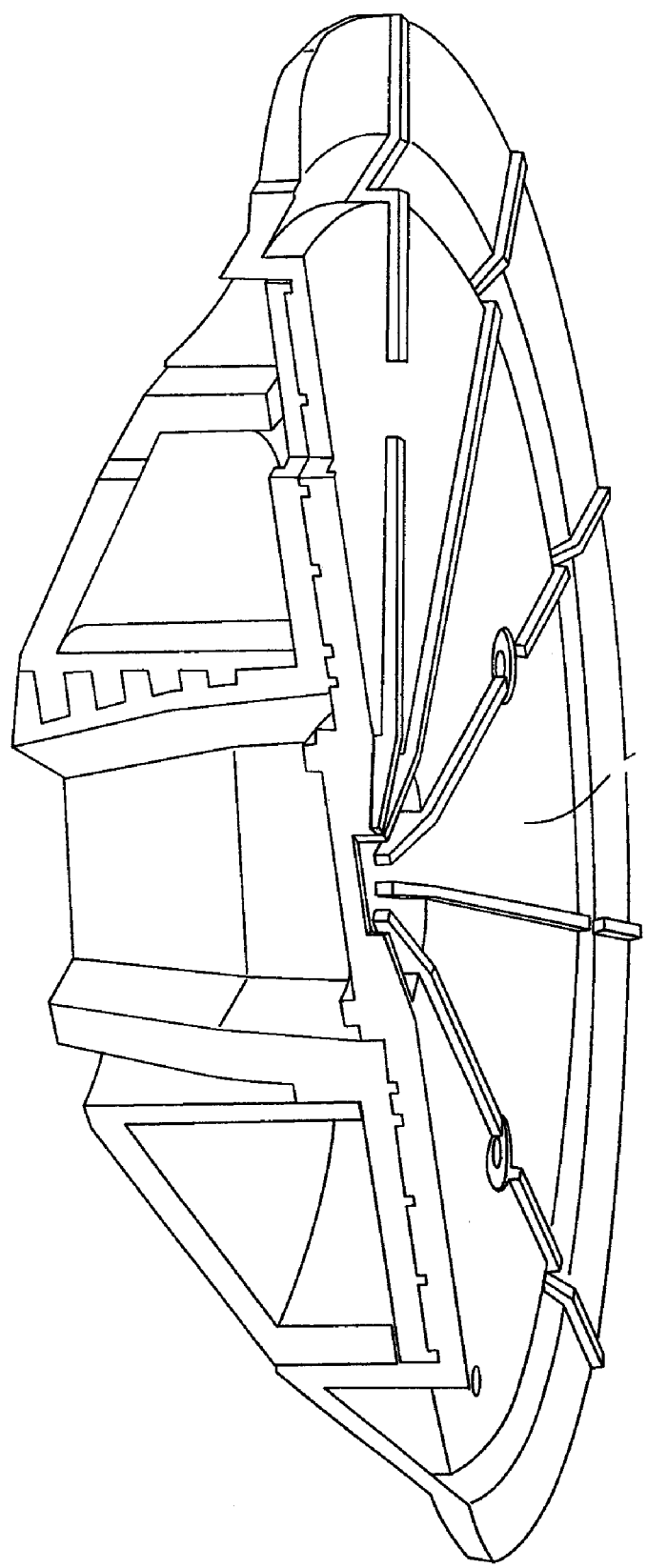
FIG. 16 is a perspective cross sectional view of the device showing the double wall structure of the protection chamber without the illumination module.
Figure 17:
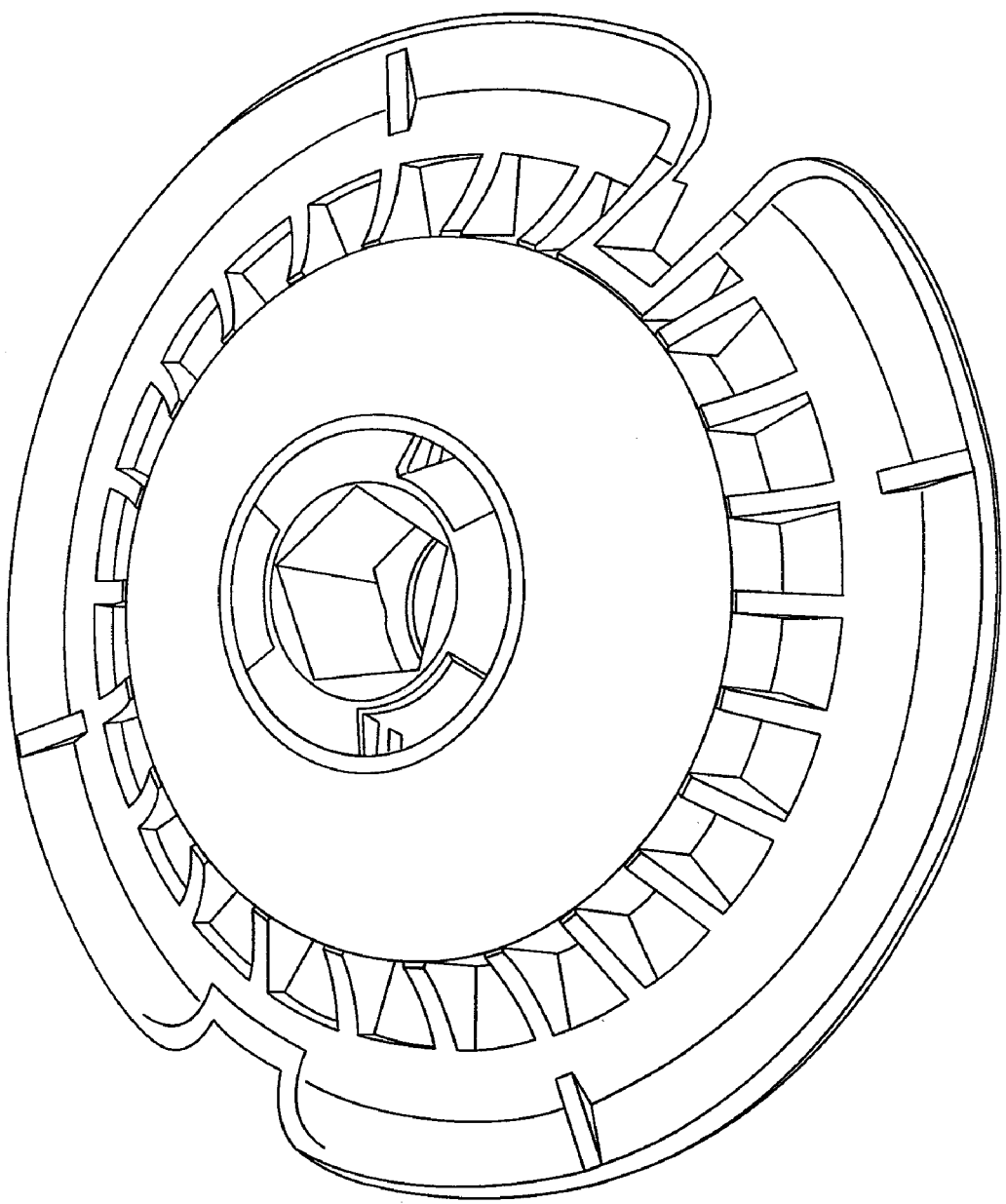
FIG. 17 is a top perspective view of elements of FIG. 13 in an assembled condition.
Figure 18:
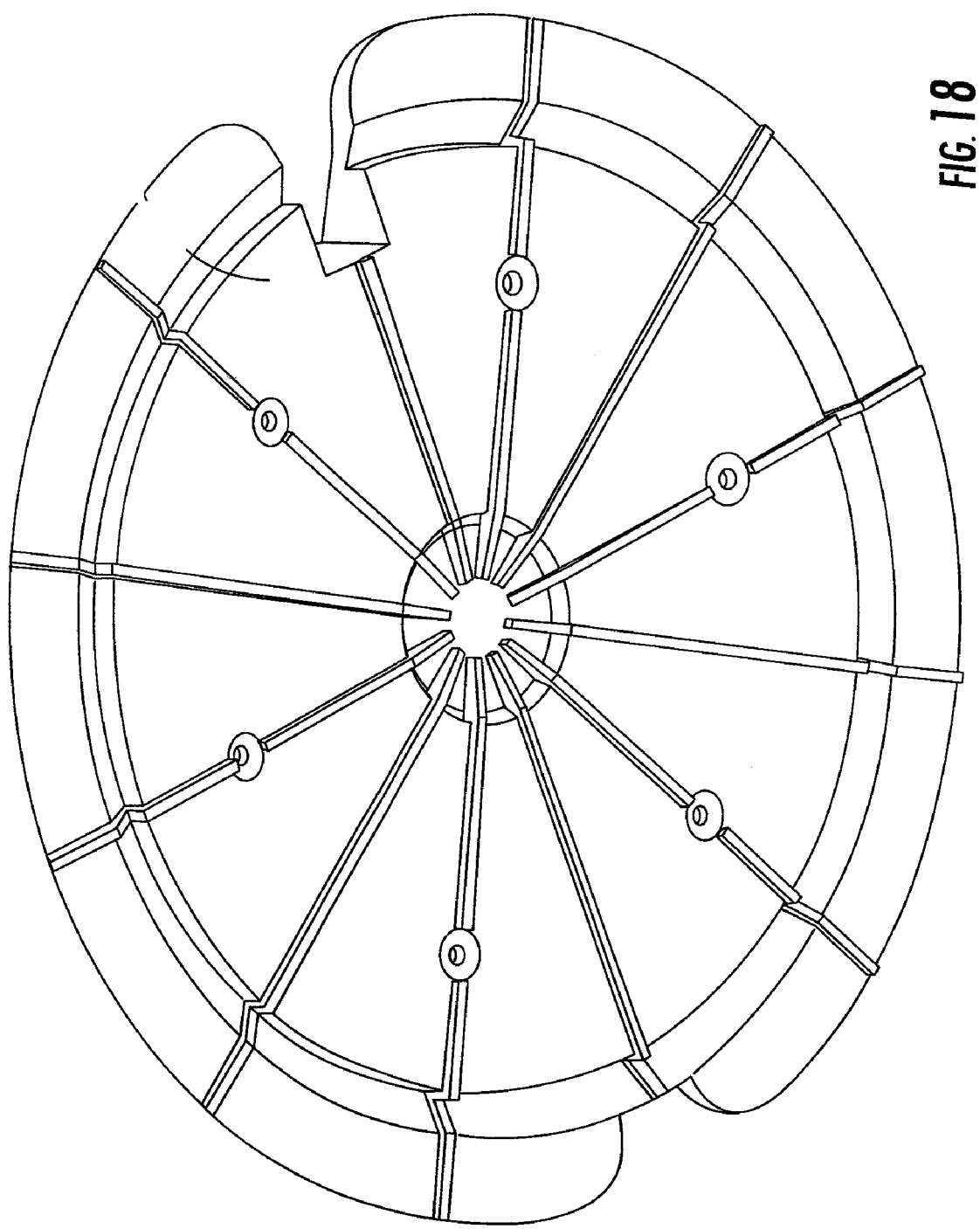
FIG. 18 is a bottom perspective view of the device.
Figure 19:
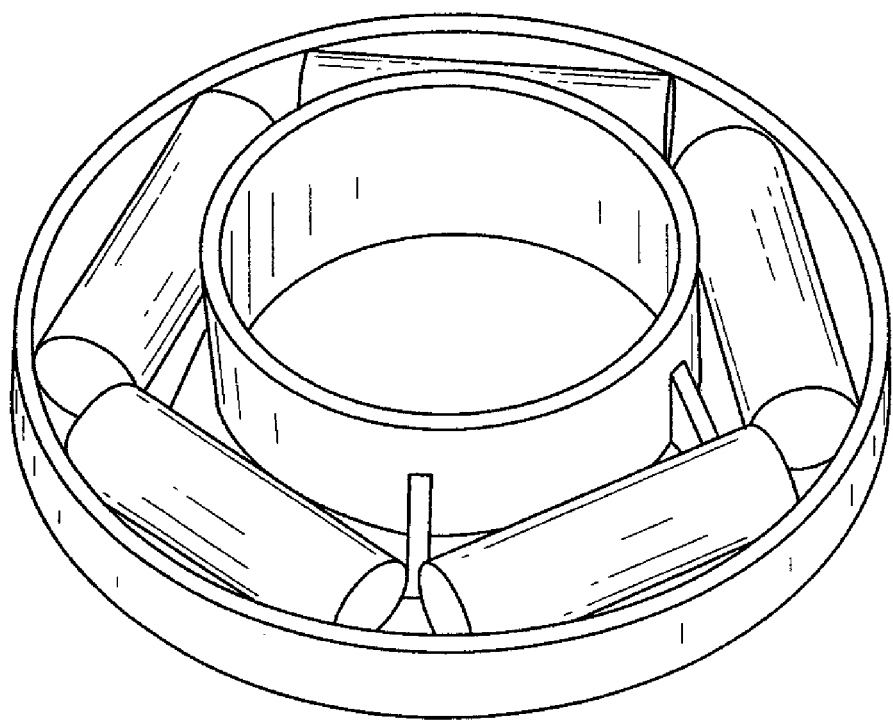
FIG. 19 is a view of the bottom part of the battery holder in the battery module.

The protection chamber 16 is provided with a central cavity 46A for retaining and controlling the operation of the illumination module. The central cavity 46A is generally conical in shape and tapers inwardly toward the top portion thereof to provide a positive and secure engagement with the base portion 38 of the illumination module. The central cavity is also pentagon shaped in cross section which corresponds to the pentagon shaped cross section of the lower portion of the illumination module. This relationship prevents rotation of the illumination module whenever it is depressed. The deployment module housing is also provided with a plurality of circumferentially spaced, vertically aligned helix screw assembly members 72 along the outer surface thereof. These screw assembly members are arranged in vertically aligned columns 74 as illustrated in FIGS. 2 and 13. The battery module 18 is also provided with a plurality of spaced circumferentially spaced, vertically aligned helix screw assembly members 76 along the inner surface thereof. These screw assembly members are arranged in vertically aligned columns 78 as illustrated in FIGS. 2 and 13. The spacing between the vertical columns 74 is such that the vertical columns 78 can pass there between and vise versa. The helix screw assembly members 72 of the deployment module are spaced with respect to the helix screw assembly members 76 of the battery module such that when the deployment module 16 is nested within the battery module 18 and the modules are turned with respect to each other the helix screw assembly members 72 are vertically positioned between helix screw assembly members 76 as illustrated in FIG. 12. This arrangement allows the modules to be locked together and provides the high impact double wall construction as provided by the protection chamber. This double wall construction provides the vertical support for the hazard marker as required to with stand the impact by vehicle tires, etc.

A lens 82 can be placed over the top of the upper portion 36 of the illumination module. The lens is designed to redirect the light from the LEDs so that it is projected vertically upwardly in a pattern.

This sunshield 84 also serves as a support for a flag 86 attached thereto. The top portion of the flag can also serve as a handle 84a for easy retrieval of the units with out having to bend down. The sun shield 84 cooperates with the illumination module to securely attach the sun shield to the illumination module. The sunshield is designed to engage the light plug 14 with a quick release lock thread 26. The sun shield extends radically outwardly from the illumination module so as to provide shade from the sun for the LEDs in the illumination module. This arrangement permits better visibility of the LEDs during the daytime and in bright sun.

Figure 24:
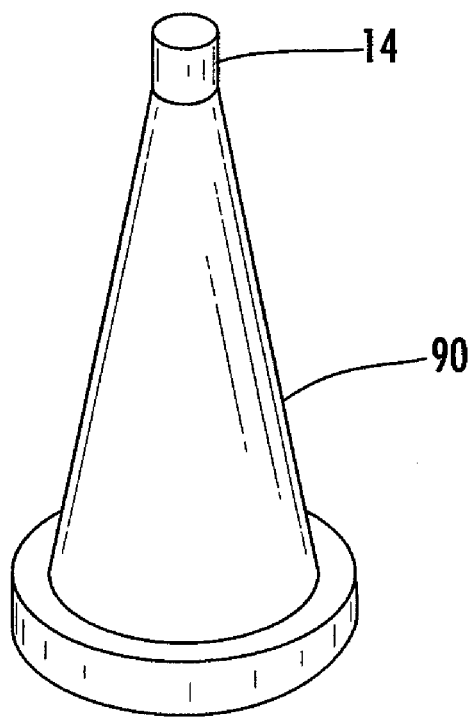
FIG. 24 is a perspective view of a cone with the hazard marker mounted on top thereof.
Figure 25:
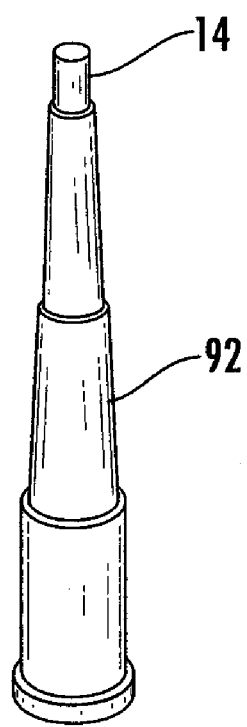
FIG. 25 is a perspective view of a hazard staff with the hazard marker mounted on top thereof.
Figure 26:
FIG. 26 is a top view of the flexible printed circuit board with light sources mounted to the outside surface.
Figure 27:
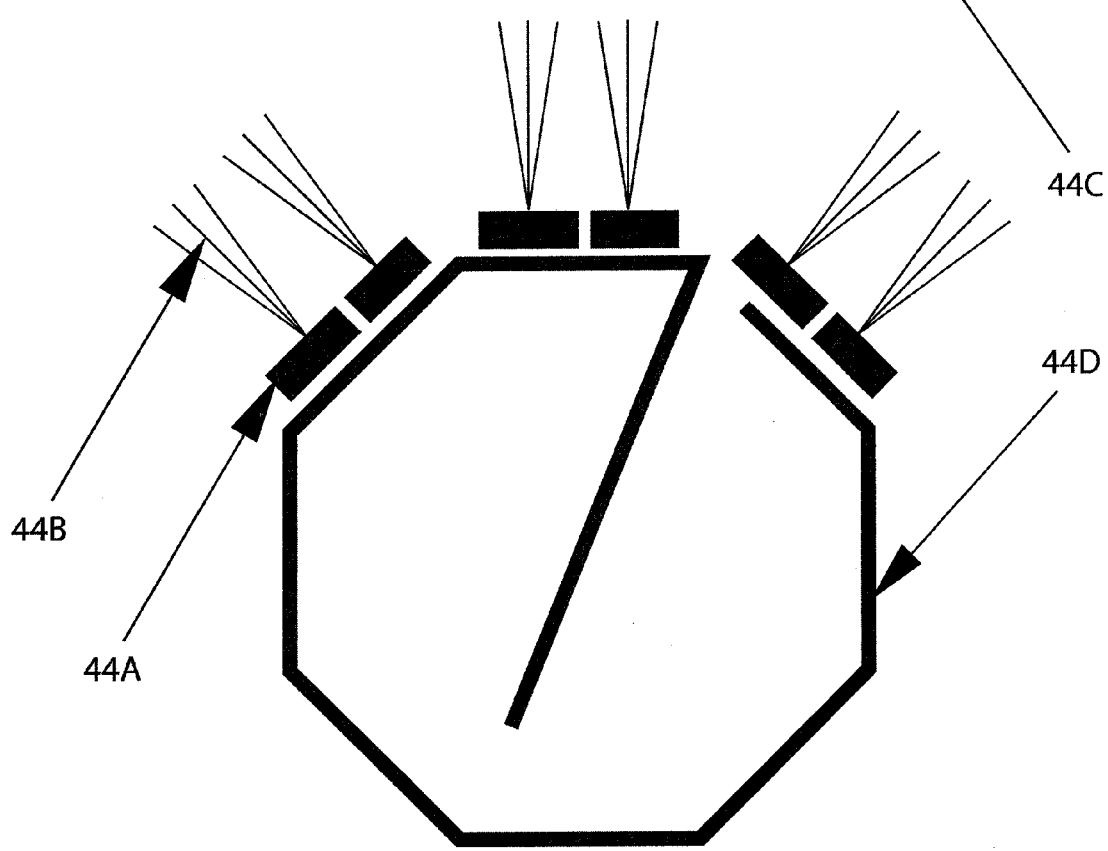
FIG. 27 is a top view of the same printed circuit board as shown in FIG. 26 curved to accommodate insertion into the light plug housing as shown in FIG. 20.

The illumination module together with a power supply can be positioned within or on top of a cone 90, as shown in FIG. 24. The cone may be formed of a translucent material so that the illumination from the hazard marker shows there through. The illumination module and a power supply could also be positioned atop or within a staff 92 as shown in FIG. 25. The staff could be a traffic control stick commonly employed by police officers for traffic control. The staff could also be telescopic and used as a hazard indicator.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments are intended to be exemplary and are not intended as limitations on the scope. Changes therein and other used will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. An Omni directional illuminated hazard marker comprising in combination:
    a base module;
    a removable waterproof battery module;
    an Omni directional light plug module;
    a double walled protection chamber;
    said Omni directional light plug module traversing between a protection chamber position, and an elevated operating position;
    each said module being constructed and arranged for cooperative assembly;
    wherein said base module is constructed and arranged for cooperative engagement with a protection module, thereby defining an annular region for receipt of said Omni directional light plug module;
    said waterproof battery module is constructed and arranged for cooperative engagement with a protection chamber module this engagement creates a double wall thickness in plastic in the module that provided an extreme weight load capability to said protection chamber and said base module within said annular region;
    said Omni directional light plug module being constructed and arranged for movement between said elevated operating position and said protection chamber position within said protection chamber when impacted, wherein said protection module includes a plurality of vertically aligned helix screw members circumferentially positioned along any outer surface of said protection module, said screw members are arranged in vertical columns, said columns being spaced from each other around the circumference of said outer surface of said protection module;
    said battery module includes a plurality of vertically aligned helix screw members circumferentially positioned along the inner surface of said battery module, said screw members are arranged in vertical columns, said columns being spaced from each other around the circumference of said inner surface of said battery module;
    said screw members of said modules are arranged so that said modules can be nested together and turned with respect to each other resulting in said modules being locked together this locking allows for the following;
    1. double wall plastic thickness allowing extreme weight load capacity, this thickness could not be created without the double wall design using standards or practice in the plastic industry;
    2. removable battery chamber allowing for replacement of spent batteries.

2. The Omni directional illuminated hazard marker of claim 1 wherein said battery module is arranged for cooperative assembly about a central axis, a battery chamber is removable and contains spring contacts as required to accomplish the required electrical connection to the light plug module.

3. The Omni directional illuminated hazard marker of claim 1 further comprising a unidirectional light plug being constructed and arranged for reciprocal engagement with a central region defined within said protection chamber; whereby said Omni directional light plug module reciprocates along a central axis within said central region between said first elevated operation position and a second collapsed protection position.

4. The Omni directional illuminated hazard marker of claim 3 further comprising said Omni directional light plug module, this module incorporates a magnetic reed switch that allows switch contact to be achieved when the light plug module is depressed into a protection chamber, thus eliminating the requirement for an external switch, the base model incorporates a counterpart magnet as required to close the reed switch.

5. The Omni directional illuminated hazard marker of claim 1 wherein light sources are LEDs.

6. The Omni directional illuminated hazard marker of claim 1 wherein light sources are activated in sequence.

7. The Omni directional illuminated hazard marker of claim 6 wherein said sequence simulates a flare.

8. The Omni directional illuminated hazard marker of claim 6 wherein said sequence simulates a rotating beacon.

9. The Omni directional illuminated hazard marker of claim 1 wherein light sources are activated simultaneously.

10. The Omni directional illuminated hazard marker of claim 1 wherein light sources are activated intermittently.

11. The Omni directional illuminated hazard marker of claim 1 further comprising a tubular shaped single flexible circuit board containing all light sources and ancillary electronics as required to operate the light sources.

12. The Omni directional illuminated hazard marker of claim 11 wherein said circuit board further includes means for energizing each light source in banks of lights simultaneously and intermittently thereby producing a visible light that appears to flash.

13. The Omni directional illuminated hazard marker of claim 11 wherein said circuit board further includes means for energizing light sources in banks of lights sequentially and intermittently thereby producing a visible light that appears to rotate.

14. An Omni directional illuminated hazard marker comprising in combination:
    a base module;
    a removable waterproof battery module;
    an Omni directional light plug module;
    a double walled protection chamber;
    said Omni directional light plug module traversing between a protection chamber position, and an elevated operating position;
    each said module being constructed and arranged for cooperative assembly;

wherein said base module is constructed and arranged for cooperative engagement with a protection module, thereby defining an annular region for receipt of said Omni directional light plug module;

said waterproof battery module is constructed and arranged for cooperative engagement with a protection chamber module this engagement creates a double wall thickness in plastic in the module that provided an extreme weight load capability to said protection chamber and said base module within said annular region;

said Omni directional light plug module being constructed and arranged for movement between said elevated operating position and said protection chamber position within said protection chamber when impacted, wherein said Omni directional light plug module further includes a plurality of banks of light sources circumferentially arranged around said Omni directional light plug module; said banks of lights comprise a plurality of vertically disposed light sources, the placement creates a large viewing area associated with a high density light placement, wherein said marker contains a circuit board which;

a connection to a source of power;

a pulse width modulation boost current regulator connected to sources of light;

light source drivers with variable current control;

a PIC controller;

a separate voltage regulator connected to said PIC controller;

said PIC controller controlling via serial data top a light source current driver in a fashion that activate said light sources either sequentially or simultaneously in a desired pattern and a desired intensity;

said PIC controller sensing a low battery condition and activating said light sources to indicate such condition;

said PIC controller regulating the source of power when said source is other than batteries.

15. The Omni directional illuminated hazard marker of claim 1 wherein said modules are made of high impact plastic.

16. The Omni directional illuminated hazard marker of claim 4 further comprising:

a sun shield attachable to said light plug module;

said sun shield including a flag mounted thereon, and a top mounted handle for easy retrieval.

17. The Omni directional illuminated hazard marker of claim 4 further comprising:

a lens;

said lens being constructed and arranged to fit on top of said light plug module;

said lens adapted to project light from said light plug module vertically upward.

18. The Omni directional illumination hazard marker of claim 1 wherein light sources are Zenon strobe tubes.

19. The Omni directional illumination hazard marker of claim 11 wherein said tubular shaped single flexible circuit board is curved into a tube shape to create a 360 degree array of LEDs around the circumference of the light plug module.

* * * * *